F. M. JOHNSTON.
TROLLEY APPARATUS.
APPLICATION FILED JUNE 6, 1921.
1,401,082.  Patented Dec. 20, 1921.
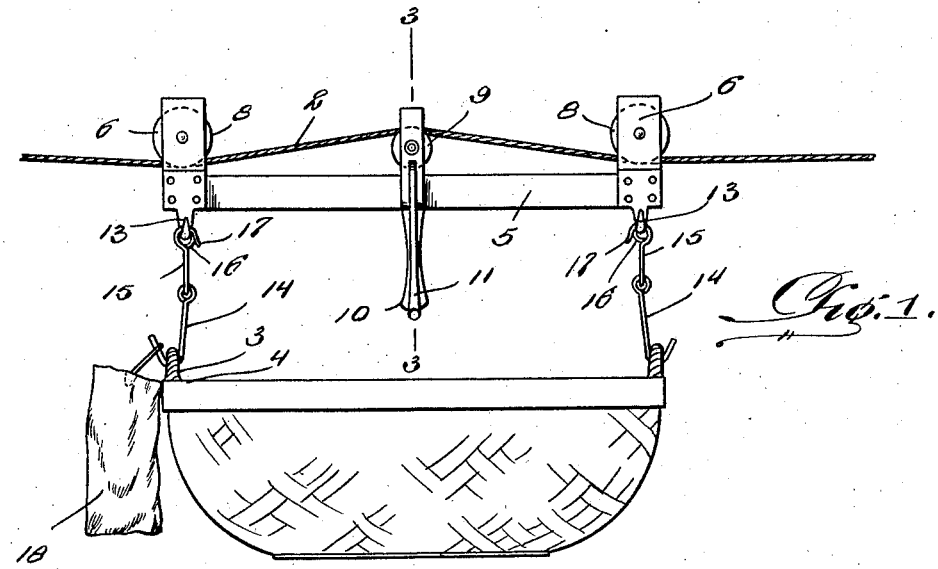
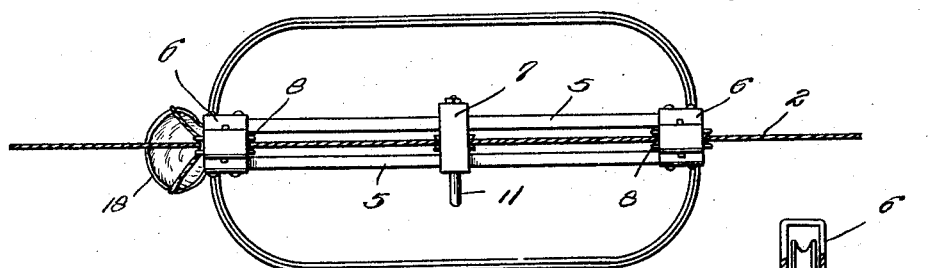
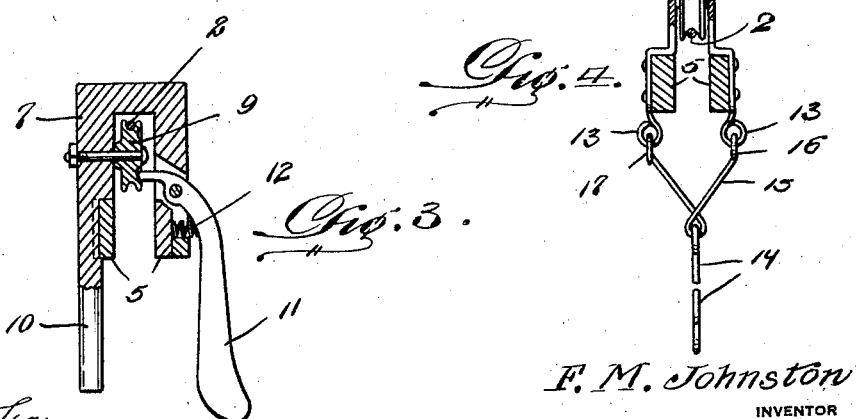
F. M. Johnston
INVENTOR
BY Victor J. Evans
ATTORNEY
WITNESSES:

UNITED STATES PATENT OFFICE.

FRANCIS MARION JOHNSTON, OF HOFFMAN, OKLAHOMA.

TROLLEY APPARATUS.

1,401,082.	Specification of Letters Patent.	Patented Dec. 20, 1921.

Application filed June 6, 1921. Serial No. 475,406.

*To all whom it may concern:*

Be it known that I, FRANCIS M. JOHNSTON, a citizen of the United States, residing at Hoffman, in the county of Okmulgee and State of Oklahoma, have invented new and useful Improvements in Trolley Apparatus, of which the following is a specification.

The object of my present invention is the provision of a simple, inexpensive and conveniently operated trolley apparatus for facilitating the movement of a wash basket full of clothes to and from the point where the clothes are placed on a line.

To the attainment of the foregoing, the invention consists in the improvement as hereinafter described and definitely claimed.

In the accompanying drawings, forming part of this specification:—

Figure 1 is a side elevation showing my novel apparatus in use.

Fig. 2 is a plan of the same.

Fig. 3 is a transverse section taken in the plane indicated by the line 3—3 of Fig. 1.

Fig. 4 is an enlarged detail hereinafter explicitly referred to.

Similar numerals of reference designate corresponding parts in all of the views of the drawings.

I illustrate my novel apparatus in conjunction with a wash basket or clothes line basket 1, and a line 2 from which the basket is to be suspended and on which the basket is designed to be moved to and from the point of discharge. The basket 1 is of ordinary construction, being preferably provided with handles 3, fixed at 4 to the body of the basket.

My novel apparatus comprises longitudinal and parallel body bars 5, end standards 6 fixed to and rising from the ends of the body bars 5, an intermediate standard 7 fixed to and rising from the transverse central portion of the bars 5, circumferentially grooved wheels 8 mounted in the standards 6 and adapted to travel on the line 2, a wheel 9 mounted in the standard 7 and arranged to travel at the underside of the line 2, Fig. 1, a pendent handle 10 fixed to the transverse central portion of one body bar 5, and a hand lever 11, subject to the action of a spring 12. The wheel 9 is released for movement by manipulation of the hand lever 11 which normally presses against the side of the wheel. The pendent handle 10 is to enable an operator to freely move the apparatus along the line, when the lever 11 is held out of engagement with the wheel 9.

For the convenient connection of a basket such as the basket 1 to my novel apparatus I make the standard 6 of bifurcated form and provide it with terminal eyes 13 arranged slightly below the body bars 5 as best shown in Fig. 4. I also provide hooks 14 to engage the handles 3 of the basket, the said hooks 14 being each carried by a bail 15, one end 16 of which is connected to one eye 13 in a permanent manner and the other end 17 of which is hook shaped so as to be capable of ready engagement with and disengagement from the opposite eye 13. This latter provision manifestly permits the apparatus being readily placed on and removed from a line such as indicated by 2.

Manifestly the handles 3 of the basket 1 may be expeditiously and easily handled with and disengaged from the hooks 14, and after the basket is suspended as illustrated it may be very conveniently moved a considerable distance without effort on the part of the operator. It will also be apparent that when the operator releases the handle 11 the apparatus and the basket suspended therefrom will be maintained against movement on the line 2.

Notwithstanding the practical advantages of my novel apparatus it will be noted that the apparatus is simple and inexpensive in construction, is well adapted for exposure to the weather and is devoid of delicate parts such as are likely to get out of order after a short period of use.

When desired one of the hooks 14 may be utilized to carry a clothes pin basket, indicated by 18 in Fig. 1.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A trolley apparatus for carrying a clothes basket, comprising parallel and spaced longitudinal body bars, pendent eyes at the ends of said body bars, means connecting said bars together, bails connected to the said eyes, each of said bails being detachably connected at one end, and pendent hooks flexibly connected to the bails and adapted to be engaged with the handles of a clothes basket.

In testimony whereof I affix my signature.

FRANCIS MARION JOHNSTON.